(12) United States Patent
Dagher et al.

(10) Patent No.: US 10,598,155 B2
(45) Date of Patent: Mar. 24, 2020

(54) FLOATING HYBRID COMPOSITE WIND TURBINE PLATFORM AND TOWER SYSTEM WITH SUSPENDED MASS

(71) Applicant: University of Maine System Board of Trustees, Orono, ME (US)

(72) Inventors: Habib J. Dagher, Veazie, ME (US); Anthony M. Viselli, Bangor, ME (US); Andrew J. Goupee, Ellsworth, ME (US)

(73) Assignee: University of Maine System Board of Trustees, Orono, ME (US)

( * ) Notice: Subject to any disclaimer, the term of this patent is extended or adjusted under 35 U.S.C. 154(b) by 573 days.

(21) Appl. No.: 15/346,320

(22) Filed: Nov. 8, 2016

(65) Prior Publication Data

US 2017/0051724 A1     Feb. 23, 2017

Related U.S. Application Data

(63) Continuation of application No. 13/883,652, filed as application No. PCT/US2011/059335 on Nov. 4, 2011, now Pat. No. 9,518,564.

(Continued)

(51) Int. Cl.
*F03D 13/25* (2016.01)
*B63B 5/14* (2006.01)
(Continued)

(52) U.S. Cl.
CPC .............. *F03D 13/25* (2016.05); *B63B 1/048* (2013.01); *B63B 1/107* (2013.01); *B63B 5/14* (2013.01);
(Continued)

(58) Field of Classification Search
CPC . F03D 1/006; F03D 1/04; F03D 1/045; F03D 13/20; F05B 2240/93;
(Continued)

(56) References Cited

U.S. PATENT DOCUMENTS 5,107,784 A * 4/1992 Lacy ....................... B63B 35/34
114/263
7,156,586 B2 1/2007 Nim
(Continued)

FOREIGN PATENT DOCUMENTS

EP     2076425 B1    9/2010
GB     2378679 A     2/2003
(Continued)

OTHER PUBLICATIONS

Japanese Notice of Reasons for Rejection, Application No. JP 2015-505978, dated Jan. 23, 2017.

*Primary Examiner* — Dwayne J White
*Assistant Examiner* — Adam W Brown
(74) *Attorney, Agent, or Firm* — MacMillan, Sobanski & Todd, LLC

(57) ABSTRACT

A wind turbine platform configured to float in a body of water and support a wind turbine thereon includes a buoyant hull platform. A wind turbine tower is centrally mounted on the hull platform and a wind turbine is mounted to the wind turbine tower. An anchor is connected to the hull platform and to the seabed, and a weight-adjustable mass is suspended from the hull platform.

7 Claims, 14 Drawing Sheets

Related U.S. Application Data

(60) Provisional application No. 61/410,127, filed on Nov. 4, 2010.

(51) Int. Cl.
*B63B 5/24* (2006.01)
*B63B 1/10* (2006.01)
*B63B 1/04* (2006.01)
*B63B 21/50* (2006.01)
*B63B 35/44* (2006.01)
*F03D 13/30* (2016.01)

(52) U.S. Cl.
CPC .............. *B63B 5/24* (2013.01); *B63B 21/50* (2013.01); *B63B 2001/044* (2013.01); *B63B 2035/442* (2013.01); *B63B 2035/446* (2013.01); *B63B 2231/04* (2013.01); *B63B 2231/50* (2013.01); *B63B 2231/52* (2013.01); *B63B 2231/60* (2013.01); *B63B 2231/66* (2013.01); *B63B 2231/68* (2013.01); *F03D 13/30* (2016.05); *F05B 2240/912* (2013.01); *F05B 2240/93* (2013.01); *F05B 2240/95* (2013.01); *Y02E 10/727* (2013.01); *Y02E 10/728* (2013.01)

(58) Field of Classification Search
CPC .......... F05B 2240/931; F05B 2240/932; F05B 2240/95; F05B 2240/97; F05B 2240/98; F05B 2240/912; Y02E 10/727; B63B 2035/446
See application file for complete search history.

(56) References Cited

U.S. PATENT DOCUMENTS

| | | | |
|---|---|---|---|
| 7,520,237 | B1 | 4/2009 | Dimov Zhekov |
| 8,118,538 | B2* | 2/2012 | Pao ................... B63B 21/50 415/115 |
| 8,471,396 | B2* | 6/2013 | Roddier ............... B63B 35/44 290/44 |
| 9,446,822 | B2 | 9/2016 | Roddier et al. |
| 2004/0169376 | A1* | 9/2004 | Ruer ..................... E02D 27/42 290/55 |
| 2008/0240864 | A1* | 10/2008 | Belinsky ............... E02D 27/42 405/223.1 |
| 2009/0072544 | A1* | 3/2009 | Pao ....................... B63B 21/50 290/55 |
| 2009/0304453 | A1* | 12/2009 | Hardison ............... B63B 21/29 405/224 |
| 2011/0012358 | A1* | 1/2011 | Brewster ............. F03B 13/1885 290/53 |
| 2011/0192333 | A1 | 8/2011 | Lilas et al. |
| 2013/0128351 | A1 | 5/2013 | Gollier et al. |
| 2013/0160444 | A1* | 6/2013 | Foster ................... F03B 13/20 60/497 |

FOREIGN PATENT DOCUMENTS

| | | |
|---|---|---|
| JP | 2006513344 A | 4/2006 |
| JP | 2006131025 A | 5/2006 |
| JP | 2009085167 A | 4/2009 |
| JP | 2010115978 A | 5/2010 |
| JP | 2010216273 A | 9/2010 |
| JP | 2010539378 A | 12/2010 |
| JP | 2011521820 A | 7/2011 |
| JP | 2015505978 A | 2/2015 |
| WO | 2005108199 A1 | 11/2005 |
| WO | 2009087200 A2 | 7/2009 |
| WO | WO-2009131826 A2 * | 10/2009 ............ B63B 35/44 |

* cited by examiner

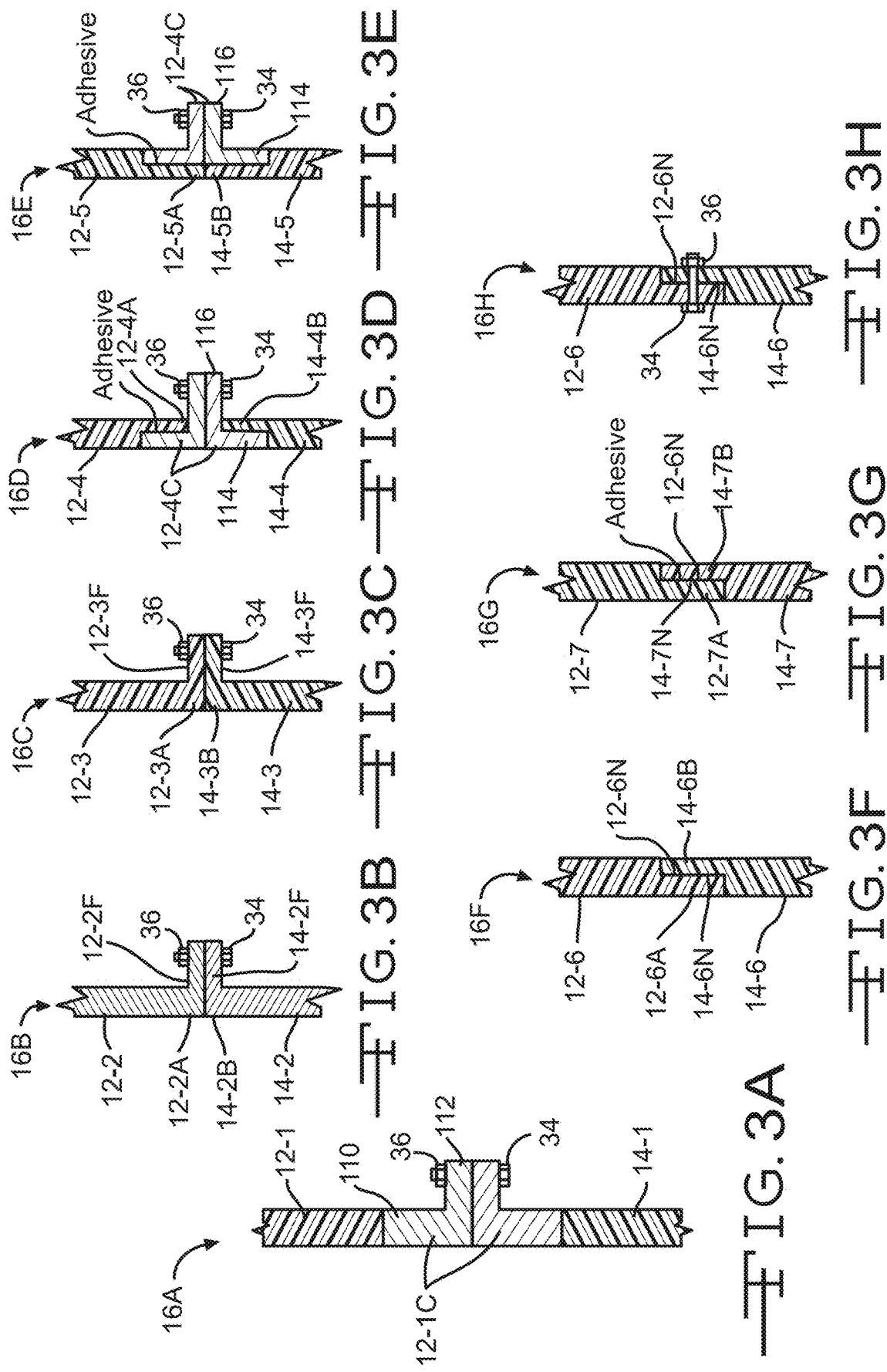

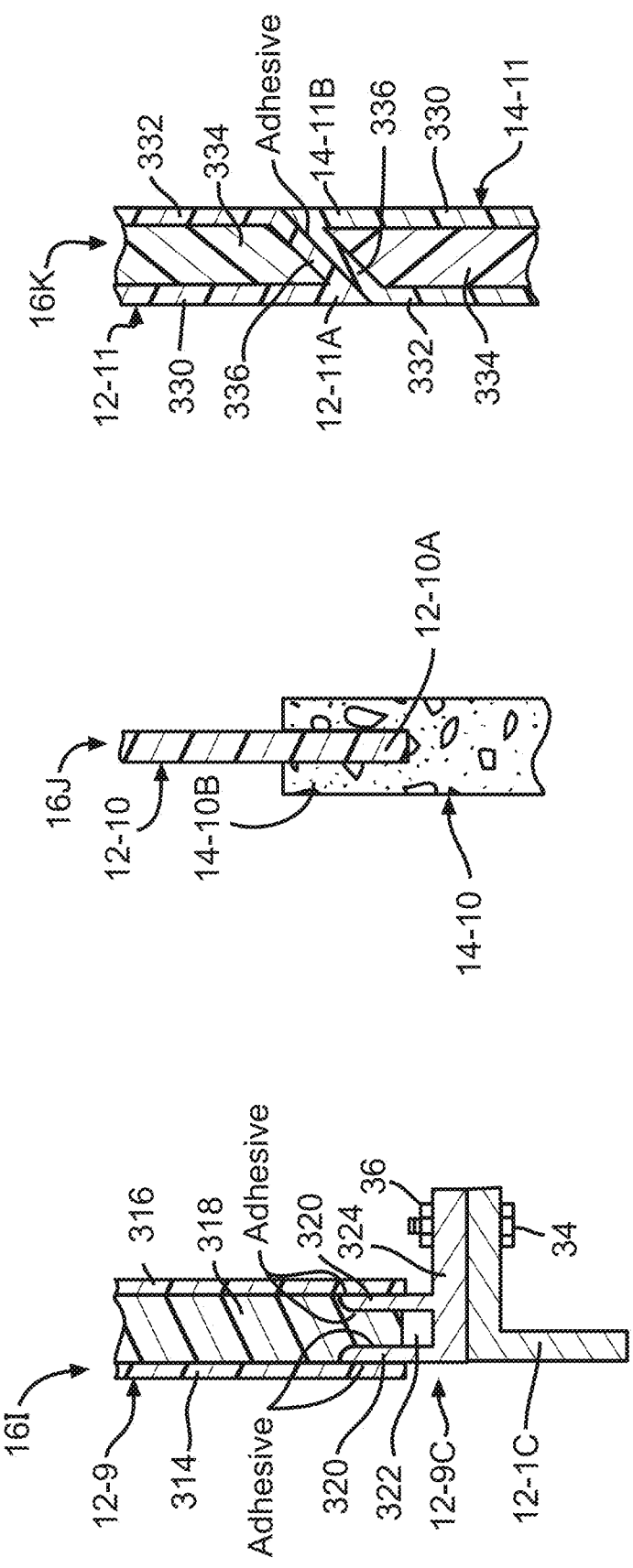

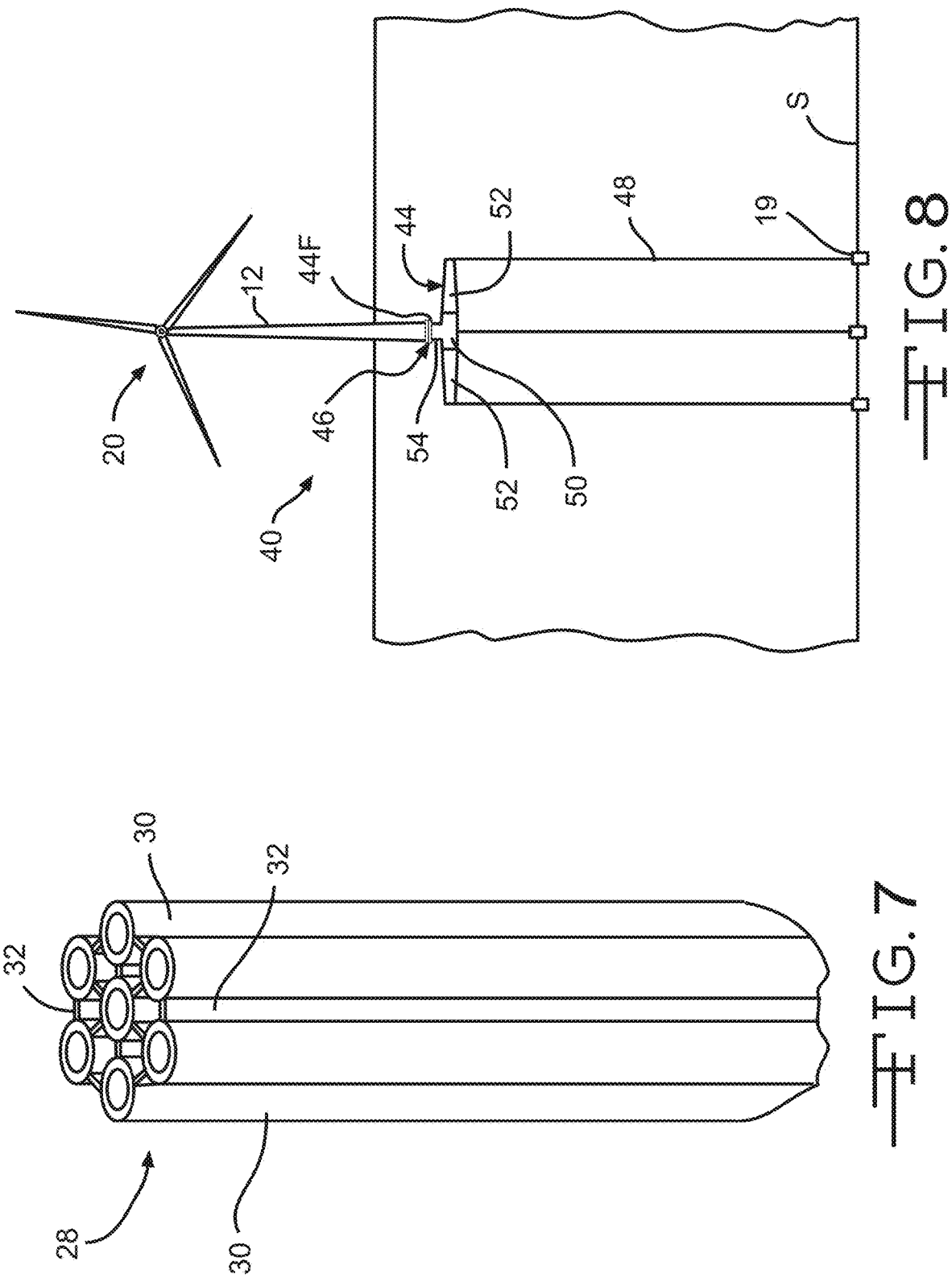

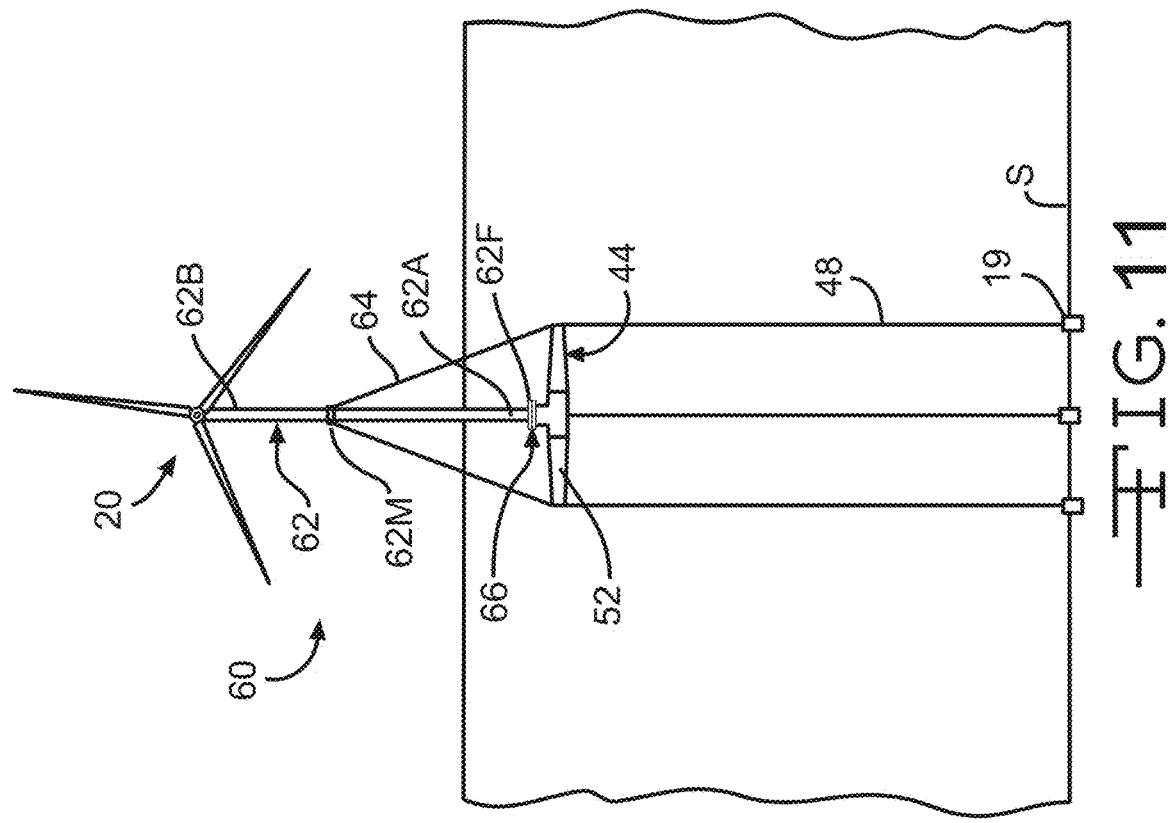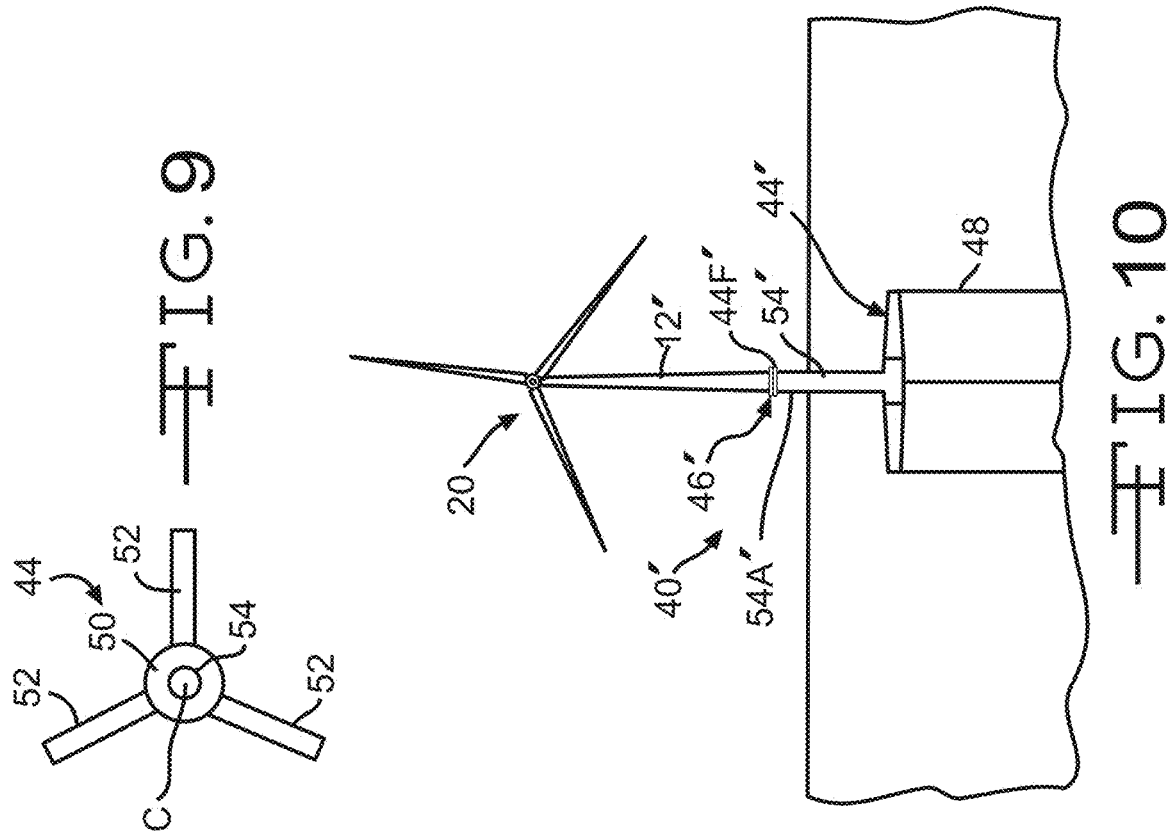

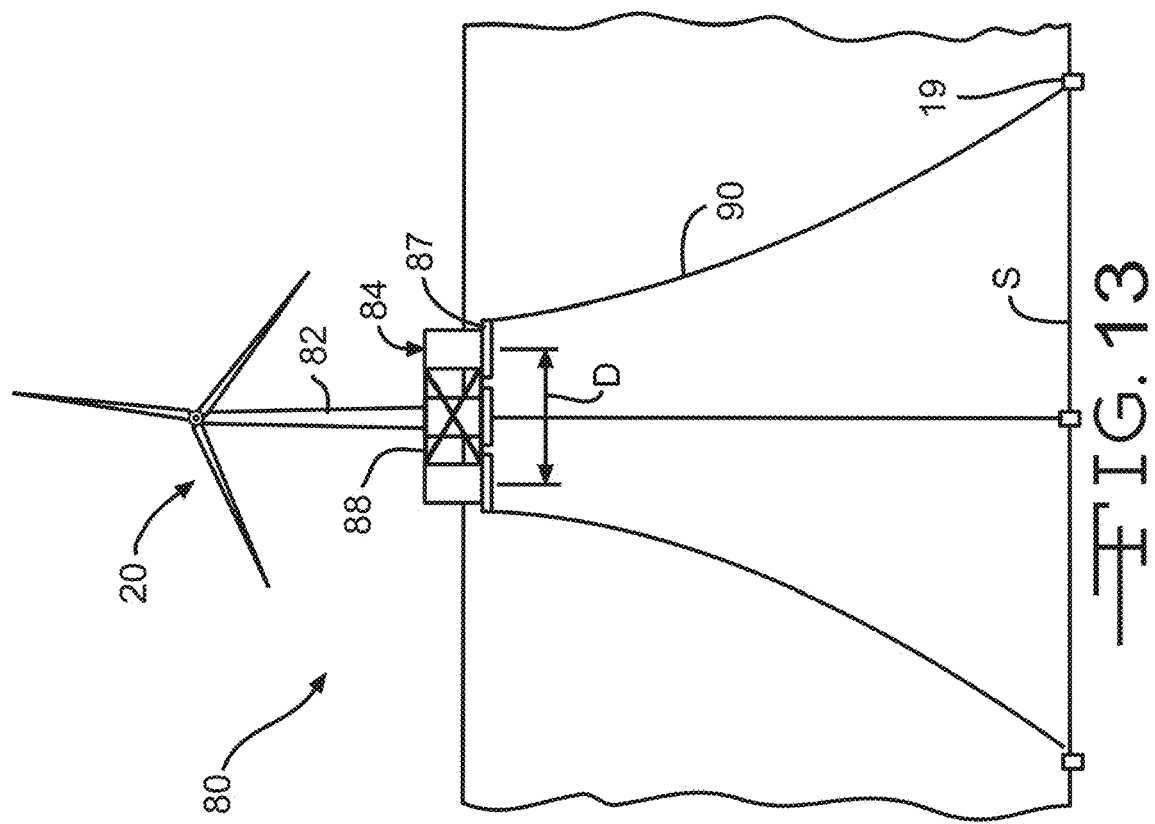
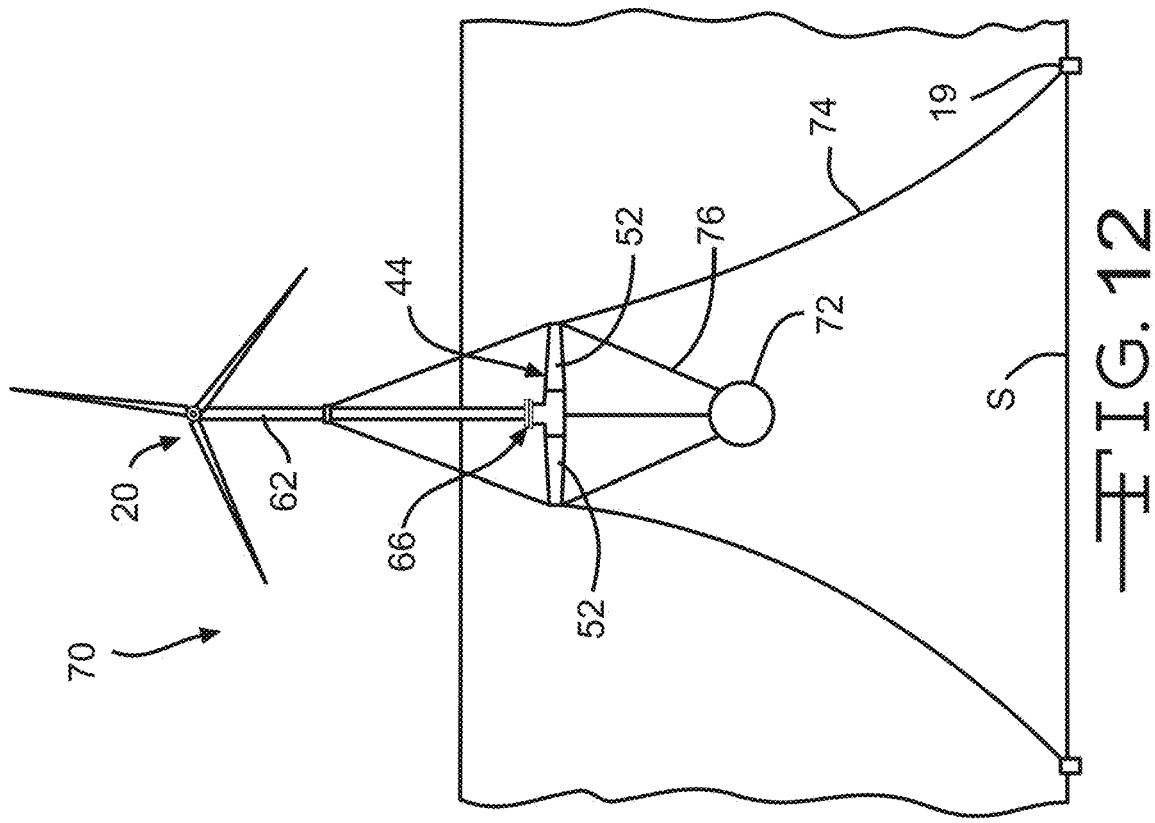

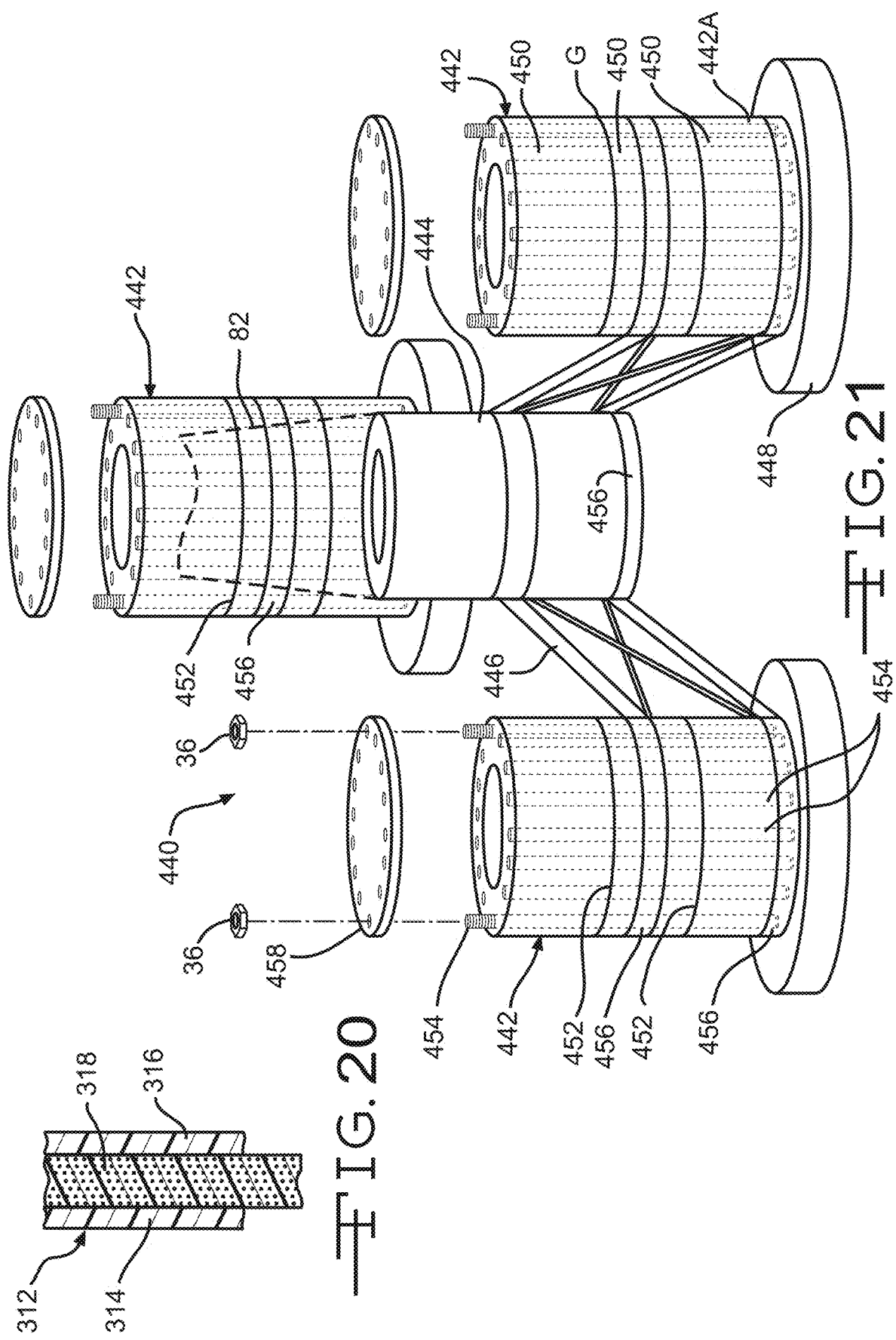

FLOATING HYBRID COMPOSITE WIND TURBINE PLATFORM AND TOWER SYSTEM WITH SUSPENDED MASS

BACKGROUND OF THE INVENTION

Various embodiments of a wind turbine platform are described herein. In particular, the embodiments described herein relate to an improved floating wind turbine platform for use in large bodies of water.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations are relatively expensive, and can only be accomplished at relatively shallow depths, such as a depth of up to about 25 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore at depths of over 60 meters. Fixed foundations for wind turbines in such deep water are not likely economically feasible. This limitation has led to the development of floating platforms for wind turbines. Known floating wind turbine platforms are formed from steel and are based on technology developed by the offshore oil and gas industry. There remains a need in the art however, for improved platforms for floating wind turbine applications.

SUMMARY OF THE INVENTION

The present application describes various embodiments of a wind turbine platform. In one embodiment, a wind turbine platform configured to float in a body of water and support a wind turbine thereon includes a buoyant hull platform. A wind turbine tower is centrally mounted on the hull platform and a wind turbine is mounted to the wind turbine tower. An anchor is connected to the hull platform and to the seabed, and a weight-adjustable mass is suspended from the hull platform.

In another embodiment, a wind turbine platform configured to float in a body of water and support a wind turbine thereon includes a buoyant hull platform having a central portion and a plurality of legs extending radially outwardly from the central portion. A wind turbine tower is centrally mounted on the hull platform and a wind turbine is mounted to the wind turbine tower. An anchor is connected to each of the hull platform legs and to the seabed, and a weight-adjustable mass is suspended from the hull platform.

In a further embodiment, a semi-submersible wind turbine platform configured to float semi-submerged on a body of water and support a wind turbine thereon includes a central buoyant pontoon. A wind turbine tower is mounted on the central buoyant pontoon and a wind turbine is mounted to the wind turbine tower. The semi-submersible wind turbine platform also includes a plurality of outer buoyant pontoons, the outer pontoons being connected to the central pontoon by structural members, with the central buoyant and outer buoyant pontoons having sufficient buoyancy to support a wind turbine tower. A weight-adjustable mass is suspended from the wind turbine platform. A longitudinal axis of the central buoyant pontoon and longitudinal axes of the outer buoyant pontoons are substantially parallel to each other and substantially perpendicular to a surface of the body of water in which the semi-submersible wind turbine platform floats, and the wind turbine is configured to operate while the semi-submersible wind turbine platform floats, semi-submerged, in the body of water.

Other advantages of the wind turbine platform will become apparent to those skilled in the art from the following detailed description, when read in view of the accompanying drawings.

BRIEF DESCRIPTION OF THE DRAWINGS

FIG. 3A is an elevational view in cross section of a portion of a first alternate embodiment of the connection joint in accordance with this invention.

FIG. 3B is an elevational view in cross section of a portion of a second alternate embodiment of the connection joint in accordance with this invention.

FIG. 3C is an elevational view in cross section of a portion of a third alternate embodiment of the connection joint in accordance with this invention.

FIG. 3D is an elevational view in cross section of a portion of a fourth alternate embodiment of the connection joint in accordance with this invention.

FIG. 3E is an elevational view in cross section of a portion of a fifth alternate embodiment of the connection joint in accordance with this invention.

FIG. 3F is an elevational view in cross section of a portion of a sixth alternate embodiment of the connection joint in accordance with this invention.

FIG. 3G is an elevational view in cross section of a portion of a seventh alternate embodiment of the connection joint in accordance with this invention.

FIG. 3H is an elevational view in cross section of a portion of an eighth alternate embodiment of the connection joint in accordance with this invention.

FIG. 3I is an elevational view in cross section of a portion of a ninth alternate embodiment of the connection joint in accordance with this invention.

FIG. 3J is an elevational view in cross section of a portion of a tenth alternate embodiment of the connection joint in accordance with this invention.

FIG. 3K is an elevational view in cross section of a portion of an eleventh alternate embodiment of the connection joint in accordance with this invention.

FIG. 7 is a perspective view of a second alternate embodiment of the hull illustrated in FIG. 1.

FIG. 8 is an elevational view of a second embodiment of a floating composite wind turbine platform in accordance with this invention.

FIG. 9 is a top plan view of the hull platform illustrated in FIG. 8.

FIG. 10 is an elevational view of a second embodiment of the floating composite wind turbine platform illustrated in FIG. 8, showing an alternate embodiment of the hull platform.

FIG. 11 is an elevational view of a third embodiment of a floating composite wind turbine platform in accordance with this invention.

FIG. 12 is an elevational view of a fourth embodiment of a floating composite wind turbine platform in accordance with this invention.

FIG. 13 is an elevational view of a fifth embodiment of a floating composite wind turbine platform in accordance with this invention.

FIG. 20 is an elevational view in cross section of a portion of an alternate embodiment of the tower illustrated in FIG. 1.

FIG. 21 is a perspective view of a fourth embodiment of the pontoon platform illustrated in FIG. 14.

DETAILED DESCRIPTION OF THE PREFERRED EMBODIMENTS

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The embodiments of the invention disclosed below generally provide improvements to various types of floating wind turbine platforms, such as spar buoy type platforms, tension leg type platforms, and semi-submersible type platforms. The invention includes improvements to various types of floating wind turbine platforms, including constructing components of the floating wind turbine platforms with materials selected to reduce the overall cost of the floating wind turbine platforms.

Figures 1, 1A:
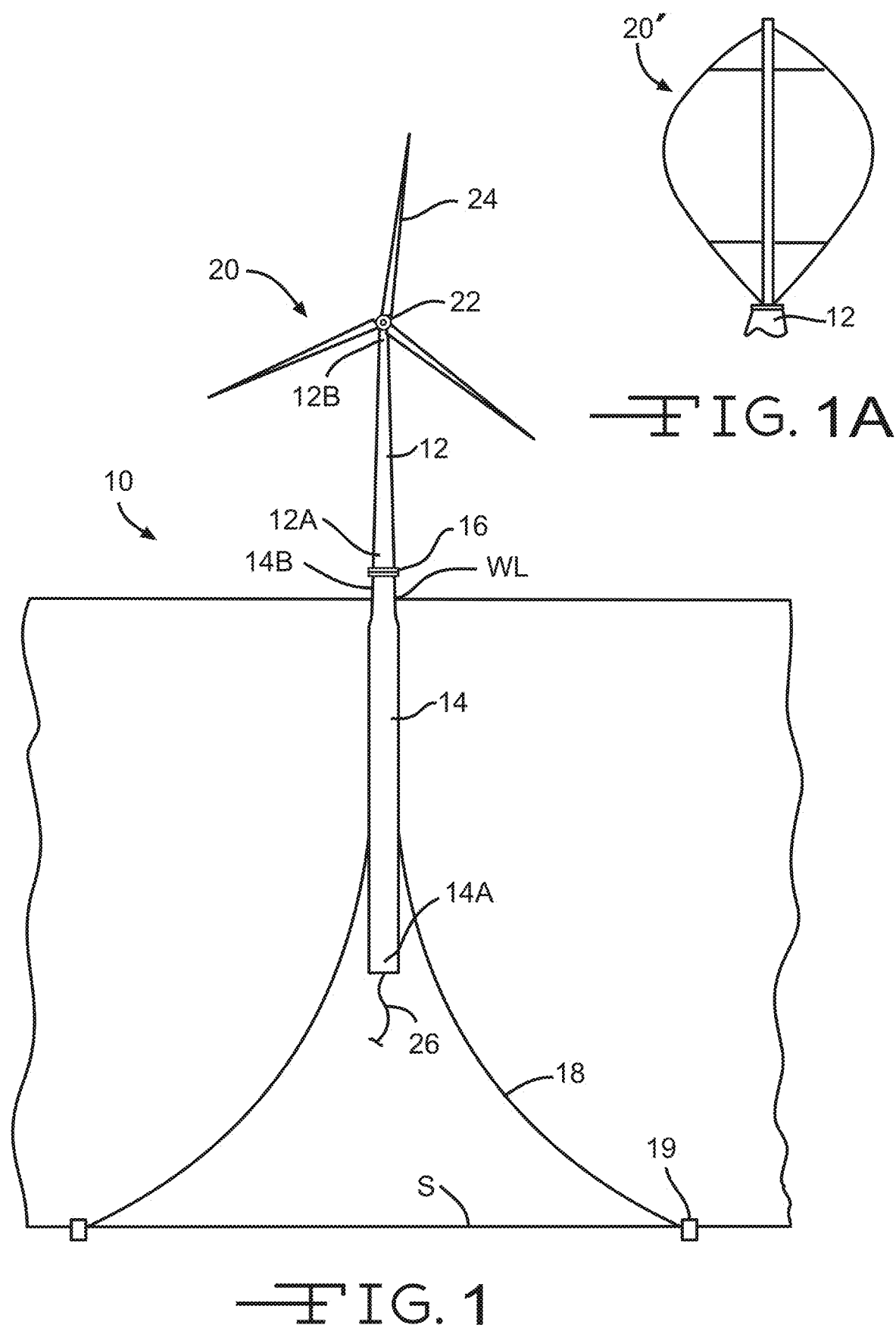
FIG. 1 is an elevational view of a spar buoy type floating wind turbine platform in accordance with this invention.
FIG. 1A is an enlarged view of a portion of an alternate embodiment of the floating wind turbine platform illustrated in FIG. 1, showing a vertical-axis wind turbine.

Referring to the drawings, particularly to FIG. 1, a first embodiment of a floating composite wind turbine platform 10 is shown anchored to the seabed S. The illustrated floating wind turbine platform 10 is a ballast stabilized, spar buoy type platform and includes a tower 12 attached to a hull 14 at a connection joint 16. Mooring lines 18 are attached to the hull 14 and further anchored to the seabed S by anchors 19. A wind turbine 20 is mounted to the tower 12.

A spar buoy type platform maintains its stability afloat by keeping its center of gravity below its center of buoyancy. This relationship of the center of gravity being below the center of buoyancy is often achieved by filling a heavy long tube or hull with ballast comprising water and dense material such as rocks.

In the embodiments illustrated herein, the wind turbine 20 is a horizontal-axis wind turbine. Alternatively, the wind turbine may be a vertical-axis wind turbine, such as shown at 20' in FIG. 1A. The size of the turbine 20 will vary based on the wind conditions at the location where the floating wind turbine platform 10 is anchored and the desired power output. For example, the turbine 20 may have an output of about 5 MW. Alternatively, the turbine 20 may have an output within the range of from about 1 MW to about 10 MW.

The wind turbine 20 includes a rotatable hub 22. At least one rotor blade 24 is coupled to and extends outward from the hub 22. The hub 22 is rotatably coupled to an electric generator (not shown). The electric generator may be coupled via a transformer (not shown) and an underwater power cable 26 to a power grid (not shown). In the illustrated embodiment, the rotor has three rotor blades 24. In other embodiments, the rotor may have more or less than three rotor blades 24.

In the illustrated embodiment, the tower 12 is formed as a tube and is fabricated from fiber reinforced polymer (FRP) composite material. Non-limiting examples of other suitable composite material include glass and carbon FRP. The tower may also be formed from a composite laminate material as shown at 312 in FIG. 20. The illustrated tower 312 includes a first FRP composite layer 314, a second FRP composite layer 316, and a foam core 318. Alternatively, the tower 12 may be formed from concrete or steel in the same manner as the hull 14, described in detail below. Additionally, the tower 12 may be formed from steel.

Figure 2:
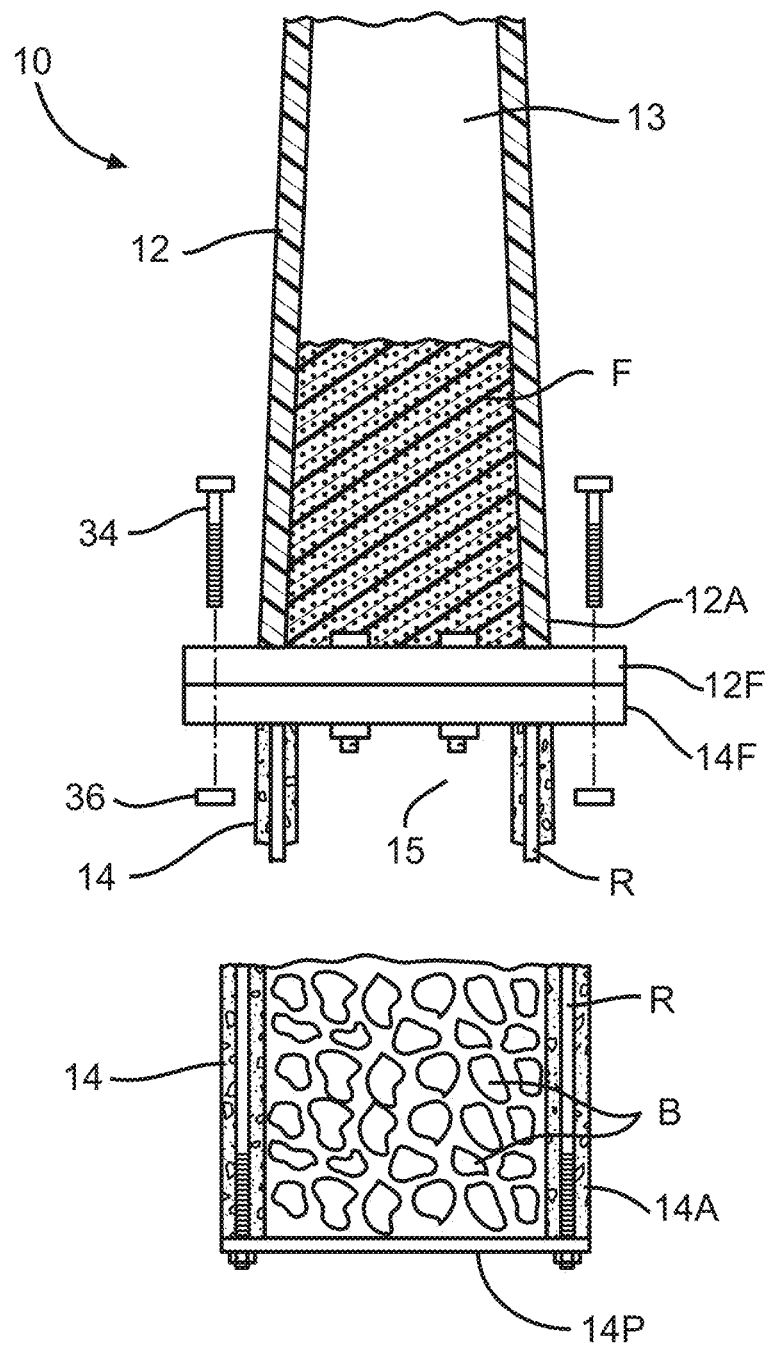
FIG. 2 is an enlarged view, partially in section, of the floating wind turbine platform illustrated in FIG. 1 showing one embodiment of a connection joint between the tower and the hull.

The interior of the tower 12 defines a cavity 13 between a first end 12A (lower end when viewing FIG. 1) and a second end 12B (upper end when viewing FIG. 1). As best shown in FIG. 2, a radially outwardly extending flange 12F is formed at the first end 12A of the tower 12, as best shown in FIG. 1A. The radially extending flange 12F defines a portion of the connection joint 16.

The cavity 13 of the tower 12 may be filled with foam or concrete for added rigidity. In the illustrated embodiment, foam F is shown filling a portion of the cavity 13 of the tower 12. Alternatively, the foam F or concrete (not shown) may fill the entire cavity 13 of the tower 12 from the first end 12A to the second end 12B. One non-limiting example of a suitable foam includes polyurethane. Sufficiently rigid material other than foam and concrete may also be used to fill or partially fill the cavity 13 of the tower 12.

Advantageously, the tower 12 formed from composite material as described above will have reduced mass above a waterline WL relative to a conventional steel tower. Because the FRP composite tower 12 has reduced mass, the mass of the hull 14 (e.g. self-weight and ballast; described in detail below) required below the water line WL to maintain stability of the floating wind turbine platform 10 may also be reduced. As used herein, waterline is defined as the line where the floating wind turbine platform 10 meets the surface of the water.

The tower 12 may have any suitable outside diameter and height. In the illustrated embodiment, the outside diameter of the tower 12 tapers from a diameter of about 6 meters at the first end 12A to a diameter of about 4 meters at the second end 12B. Alternatively, the outside diameter of the tower 12 may be any other desired diameter, such as within the range of from about 3 meters to about 12 meters. In the illustrated embodiment, the height of the tower 12 is about 90 meters. Alternatively, the height of the tower 12 may be within the range of from about 50 meters to about 140 meters.

In the illustrated embodiment, the hull 14 is formed as a tube and is fabricated from reinforced concrete. The interior of the hull 14 defines a cavity 15 between a first end 14A (lower end when viewing FIG. 1) and a second end 14B (upper end when viewing FIG. 1). Any desired process may be used to manufacture the hull 14, such as a spun concrete process or conventional concrete forms. Alternatively, other processes such as those used in the precast concrete industry may also be used. The hull 14 may be reinforced with any desired reinforcement member R. Non-limiting examples of suitable reinforcement members R include high tensile steel cable and high tensile steel reinforcement bars or REBAR. Alternatively, the hull 14 may be formed from FRP composite in the same manner as the tower 12, described above. Additionally, the hull 14 may be formed from steel.

The hull 14 may have any suitable outside diameter and height. In the illustrated embodiment, the hull 14 has a first outside diameter D1 and a second outside diameter D2 which is smaller that the first outside diameter D1. The portion of the hull 14 having the first outside diameter D1 extends from the first end 14A to a tapered transition section 14T. The portion of the hull 14 having the second outside diameter D2 extends from the transition section 14T to the second end 14B. In the illustrated embodiment, the first outside diameter D1 is about 8 meters and the second outside diameter D2 is about 6 meters. Alternatively, the first and second outside diameters D1 and D2 of the hull 14 may be any other desired diameters, such as within the range of from about 4 meters to about 12 meters and within the range of from about 4.5 meters to about 13 meters, respectively. Additionally, the hull 14 may have a uniform outside diameter. In the illustrated embodiment, the height of the hull 14 is about 120 meters. Alternatively, the height of the hull 14 may be within the range of from about 50 meters to about 150 meters.

A radially outwardly extending flange 14F is formed at the second end 14B of the hull 14, as best shown in FIG. 2. The radially extending flange 14F defines a portion of the connection joint 16. A first end 14A of the hull 14 is closed by a plate 14P. The plate 14P may be formed from any suitable substantially rigid material such as steel. Alternatively, the first end 14A of the hull 14 may be closed by a plate 14P. The plate 14P may be formed from any suitable substantially rigid material such as steel.

In the illustrated embodiment, the connection joint 16 is formed by connecting the flange 12F and the flange 14F. In the embodiment illustrated in FIG. 2, the flanges 12F and 14F are connected by bolts 34 and nuts 36. Alternatively, the flanges 12F and 14F may be connected by any other desired fasteners, such as rivets, adhesives, or by welding.

It will be understood that the flange 12F of the tower 12 and the flange 14F of the hull 14 may be formed as radially inwardly extending flanges such that the fasteners (e.g. the bolts 34 and nuts 36) are installed within the tower and hull cavities, 13 and 15 respectively.

As shown in FIG. 2, the cavity 15 of the hull 14 may be filled with ballast B to stabilize the floating wind turbine platform 10. In the illustrated embodiment, this ballast B is shown filling a portion of the cavity 15 of the hull 14, such as a lower ⅓ of the cavity 15. Alternatively, the ballast B may fill any other desired portion of the cavity 15 of the hull 14 from the first end 14A to the second end 14B. In the illustrated embodiment, the ballast B is shown as rocks. Other non-limiting examples of suitable ballast material include water, scrap steel, copper ore, and other dense ores. Other sufficiently dense material may also be used as ballast to fill or partially fill the cavity 15 of the hull 14.

The hull 14 may pre-cast at a location distant from the location where the floating wind turbine platform 10 will be deployed. During manufacture of the hull 14, the reinforcement members R may be pre-tensioned. Alternatively, during manufacture of the hull 14, the reinforcement members R may be post-tensioned. Advantageously, the reinforced concrete hull 14 described above is relatively heavy and may require less ballast B than conventional steel hulls.

A first end (upper end when viewing FIG. 1) of each mooring line 18 is attached to the hull 14. A second end (lower end when viewing FIG. 1) of each mooring line 18 is attached or anchored to the seabed S by an anchor 19, such as a suction anchor. Alternatively, other types of anchors may be used, such as a drag anchor, gravity anchor, or drilled anchor. In the illustrated embodiment, the mooring lines 18 are configured as catenary moorings. The mooring lines 18 may be formed from any desired material. Non-limiting examples of suitable mooring line material include steel rope or cable, steel chain segments, and synthetic rope such as nylon.

Figure 19:
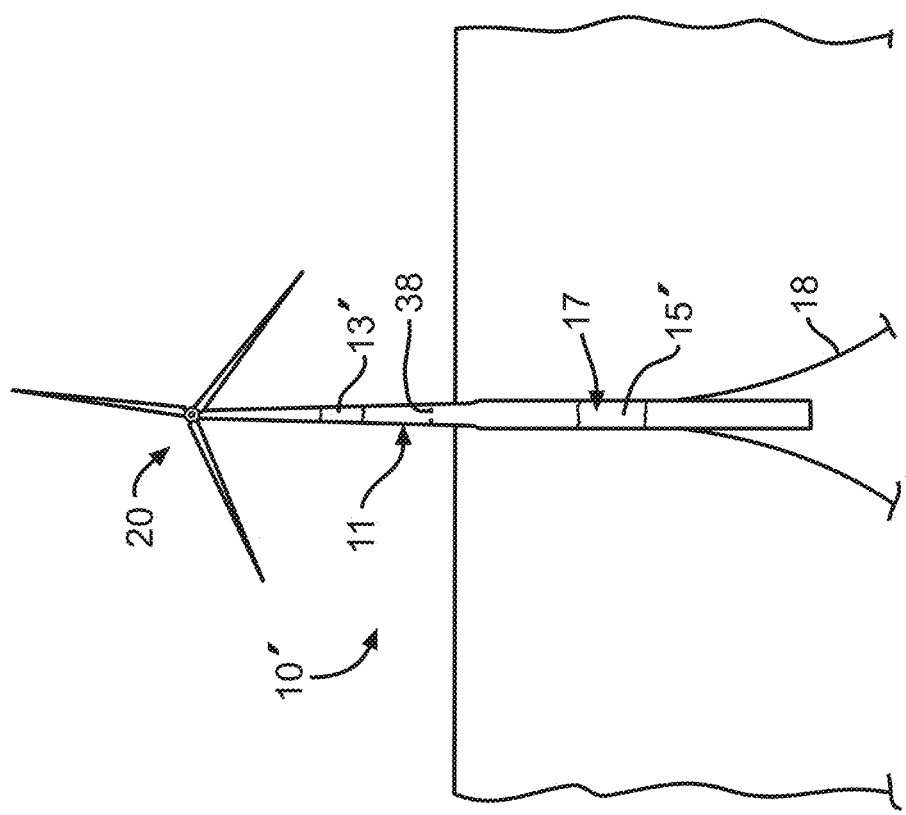
FIG. 19 is an elevational view of an alternate embodiment of the floating wind turbine platform illustrated in FIG. 1.

Referring to FIG. 19, a second embodiment of a floating composite wind turbine platform is shown at 10'. The illustrated floating wind turbine platform 10' is substantially similar to the floating composite wind turbine platform is shown at 10, but the tower 12 and the hull 14 are formed as a one-piece tower/hull member 11. In this embodiment, the connection joint 16 is not required. The one-piece tower/hull member 11 may be formed from FRP composite in the same manner as the tower 12, described in detail above. Alternatively, the one-piece tower/hull member 11 may be formed from may be formed from reinforced concrete in the same manner as the hull 14, described in detail above.

The interior of the tower/hull member 11 defines an elongated cavity 17 within the tower/hull member 11. In the illustrated embodiment, a wall 38 extends transversely within the cavity 17 and divides the cavity 17 into a tower cavity portion 13' and a hull cavity portion 15'. At least a portion of the tower cavity portion 13' may be filled with foam or concrete (not shown in FIG. 19) for added rigidity as described above. At least a portion of the hull cavity portion 15' may be filled with ballast (not shown in FIG. 19) to stabilize the floating wind turbine platform 10' as described above.

Figure 3L:
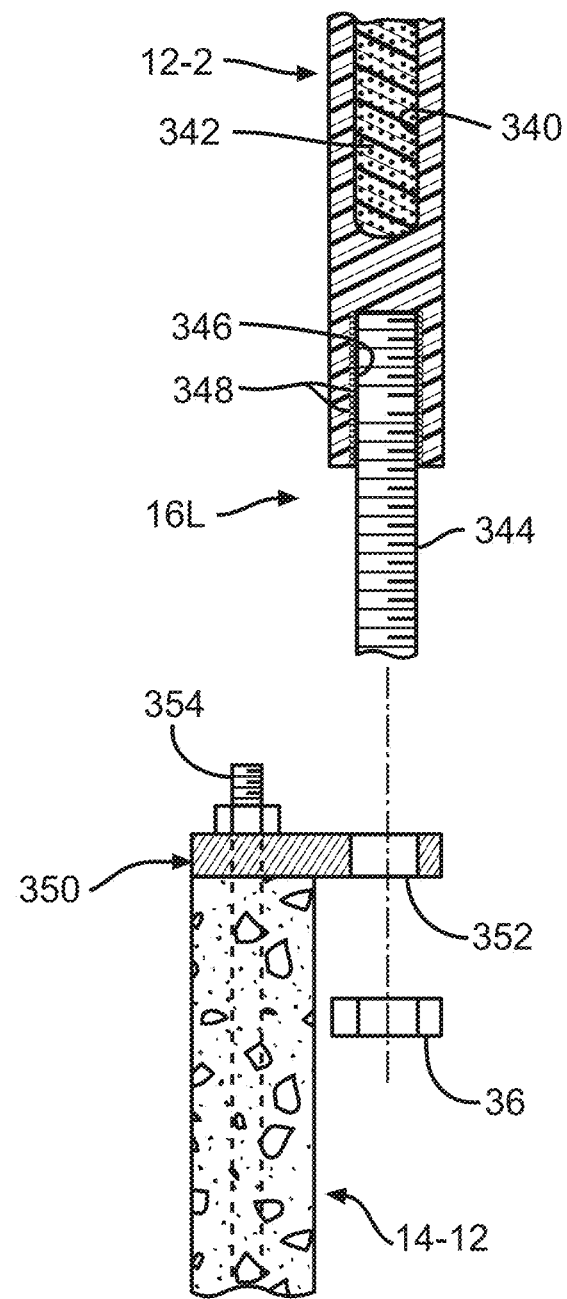
FIG. 3L is an elevational view in cross section of a portion of a twelfth alternate embodiment of the connection joint in accordance with this invention.

Referring to FIGS. 3A through 3L, alternate embodiments of the connection joint are shown at 16A though 16H respectively. As shown in FIG. 3A, a portion of a first alternate embodiment of the connection joint is shown at 16A. In the illustrated embodiment, the tower 12-1 and the hull 14-1 are formed from FRP composite as described above. The connection joint 16A includes a tower 12-1 and a hull 14-1. Each of a pair of collar members 12-1C includes a cylindrical collar portion 110 and a flange portion 112. The collar members 12-1C may be integrally formed with the FRP composite tower 12-1 and hull 14-1, respectively. In the embodiment illustrated in FIG. 3A, the flange portions 112 are connected by bolts 34 and nuts 36. Alternatively, the flange portions 112 may be connected by any other desired fasteners, such as rivets, or by welding.

As shown in FIG. 3B, a portion of a second alternate embodiment of the connection joint is shown at 16B. In the illustrated embodiment, the tower 12-2 and the hull 14-2 are formed from steel as described above. A radially extending flange 12-2F is formed at the first end 12-2A of the tower 12-2, and a radially extending flange 14-2F is formed at the second end 14-2B of the hull 14-2. The radially extending flange 12F defines a portion of the connection joint 16. In the embodiment illustrated in FIG. 3B, the flanges 12-2F and 14-2F are connected by bolts 34 and nuts 36. Alternatively, the flanges 12-2F and 14-2F may be connected by any other desired fasteners or by welding.

As shown in FIG. 3C, a portion of a third alternate embodiment of the connection joint is shown at 16C. In the illustrated embodiment, the connection joint 16C is substantially identical to the connection joint 16B, except that the tower 12-3 and the hull 14-3 are formed from FRP composite. In the embodiment illustrated in FIG. 3C, the flanges 12-3F and 14-3F are connected by bolts 34 and nuts 36. Alternatively, the flanges 12-3F and 14-3F may be connected by any other desired fasteners or by welding.

As shown in FIG. 3D, a portion of a fourth alternate embodiment of the connection joint is shown at 16D. In the illustrated embodiment, the tower 12-4 and the hull 14-4 are formed from FRP composite as described above. Each of a pair of collar members 12-4C includes a cylindrical collar portion 114 and a flange portion 116. The collar portion 114 of each of the pair of collar members 12-4C is inserted into a notch formed in the first end 12-4A of the tower 12-4 and in the second end 14-4B of the hull 14-4, respectively. A layer of adhesive may be applied between the collar members 12-4C and each of the tower 12-4 and the hull 14-4. In the embodiment illustrated in FIG. 3D, the flange portions 116 are connected by bolts 34 and nuts 36. Alternatively, the flange portions 116 may be connected by any other desired fasteners or by welding.

As shown in FIG. 3E, a portion of a fifth alternate embodiment of the connection joint is shown at 16E. In the illustrated embodiment, the tower 12-5 and the hull 14-5 are formed from FRP composite as described above. Each of a pair of the collar members 12-4C include the cylindrical collar portion 114 and the flange portion 116. The collar portion 114 of each of the pair of collar members 12-4C is inserted into a notch formed in the first end 12-5A of the tower 12-5 and in the second end 14-5B of the hull 14-5, respectively. A layer of adhesive may be applied between the collar members 12-4C and each of the tower 12-5 and the hull 14-5. In the embodiment illustrated in FIG. 3E, the flange portions 116 are connected by bolts 34 and nuts 36. Alternatively, the flange portions 116 may be connected by any other desired fasteners or by welding.

As shown in FIG. 3F, a portion of a sixth alternate embodiment of the connection joint is shown at 16F. In the illustrated embodiment, the tower 12-6 and the hull 14-6 are formed from FRP composite as described above. A notch 12-6N is formed in the first end 12-6A of the tower 12-6 and a notch 14-6N is formed in the second end 14-6B of the hull 14-6. The notch 12-6N of the first end 12-6A of the tower 12-6 is inserted into the notch 14-6N of the second end 14-6B of the hull 14-6 to define a lap joint.

As shown in FIG. 3G, a portion of a seventh alternate embodiment of the connection joint is shown at 16G. In the illustrated embodiment, the connection joint 16G is substantially identical to the connection joint 16F, except that a layer of adhesive is applied between the notches 12-7N and 14-7N.

As shown in FIG. 3H, a portion of an eighth alternate embodiment of the connection joint is shown at 16H. In the illustrated embodiment, the connection joint 16G is substantially identical to the connection joint 16F, except that lap joint is reinforced by a bolt 34 which extends through the lap joint and is fastened by a nut 36.

As shown in FIG. 3I, a portion of a ninth alternate embodiment of the connection joint is shown at 16A. In the illustrated embodiment, the tower 12-9 is formed from the composite laminate material as also shown in FIG. 20. The illustrated tower 12-9 includes the first FRP composite layer 314, the second FRP composite layer 316, and the foam core 318. The hull is not shown in FIG. 3I, but may be any of the embodiments of the hull described herein. A collar member 12-9C includes parallel cylindrical collar portions 320 and a flange portion 324. A channel 322 is defined between the collar portions 320. The collar member 12-9C is configured to be connected to another collar, such as the collar 12-1C. A layer of adhesive may be applied between the collar portions 320 and the foam core 318, and between the collar portions 320 and the first and second FRP composite layers 314 and 316, respectively. In the embodiment illustrated in FIG. 3I, the collar 12-9C and the collar 12-1C are connected by bolts 34 and nuts 36. Alternatively, the flange portions 112 may be connected by any other desired fasteners, such as rivets, or by welding.

As shown in FIG. 3J, a portion of a tenth alternate embodiment of the connection joint is shown at 16J. In the illustrated embodiment, the tower 12-10 is formed from FRP composite as described above. The hull 14-10 is formed from reinforced concrete, as described above. A first end 12-10A of the tower 12-10 is embedded in and bonded to the cured concrete of the second end 14-10B of the hull 14-10.

As shown in FIG. 3K, a portion of an eleventh alternate embodiment of the connection joint is shown at 16K. In the illustrated embodiment, the tower 12-11 and the hull 14-11 are formed from composite laminate material as also shown in FIGS. 2O 3I. The illustrated tower 12-11 includes a first FRP composite layer 330, a second FRP composite layer 332, and a foam core 334. The first end 12-11A of the tower 12-11 and the second end 14-11B of the hull 14-11 are closed by a third FRP composite layer 336. A layer of adhesive may be applied between the third FRP composite layers 336.

As shown in FIG. 3L, a portion of a twelfth alternate embodiment of the connection joint is shown at 16L. In the illustrated embodiment, the tower 12-12 is formed from FRP composite as described above. If desired, an annular cavity 340 may be formed in the tower 12-12 and filled with foam 342. Alternatively, the tower 12-12 may be formed from the composite laminate material as also shown in FIG. 2O. A plurality of threaded fasteners 344 are attached within fastener cavities 346 in the first end 12-12A of the tower. The threaded fasteners 344 may be embedded in the FRP composite material of the first end 12-12A of the tower 12-12 during manufacture of the tower 12-12. If desired, reinforcing fibers 348 may be wrapped around the threaded fasteners 344 to strengthen the bond between the FRP composite and the threaded fasteners.

The hull 14-12 is formed from reinforced concrete, as described above. An annular plate 350 is attached to the second end 14-12B of the hull 14-12 by a bolt 354. Alternatively, the annular plate 350 may be attached to the second end 14-12B of the hull 14-12 by a cable (not shown). The plate 350 includes a plurality of holes 352 through which the bolts 344 extend. Nuts 36 are attached to the bolts 344. Alternatively, the hull may be any of the hull embodiments illustrated in FIGS. 3A through 3E.

Figure 4:
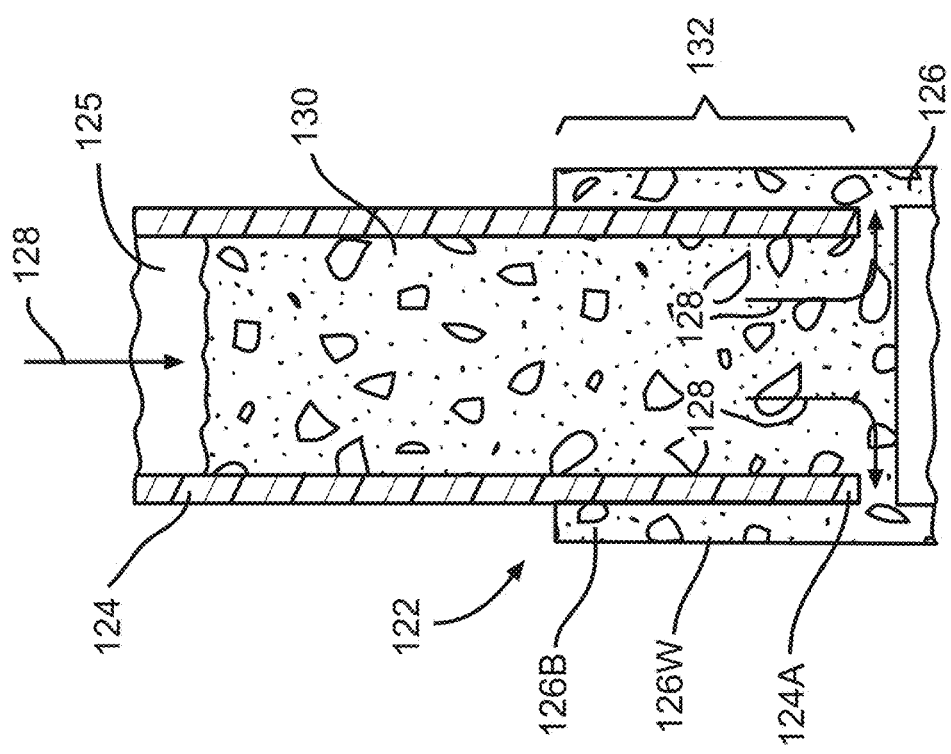
FIG. 4 is an elevational view in cross section of a portion of a thirteenth alternate embodiment of the connection joint in accordance with this invention.

Referring now to FIG. 4, a thirteenth embodiment of the connection joint is shown at 122. In the illustrated embodiment, the tower 124 is formed from FRP composite, and the hull 126 is formed from reinforced concrete, as described above. The tower 124 is substantially tubular and includes a cavity 125. The hull 126 is also substantially tubular and includes an outer wall 126W at the second end 126B of the hull 126. The first end 124A of the tower 124 is inserted into the second end 126B of the hull 126. The concrete that forms the outer wall 126W extends inwardly and upwardly into the cavity 125 of the tower 124 to define a rigidity member 130. When cured, the rigidity member 130 provides added rigidity to the tower 124.

The connection joint 122 may be formed by inserting the first end 124A of the tower 124 into a hull form (not shown) which defines the shape of the second end 126B of the hull 126 to be formed. Concrete may be poured (as indicated by the arrows 128) through the cavity 125 of the tower 124 and into the hull form to form the outer wall 126W of the second end 126B of the hull 126. When the concrete is cured, the concrete of the rigidity member 130 is contiguous with the concrete of the outer wall 126W of the second end 126B of the hull 126, thus the first end 124A of the tower 124 is embedded in and bonded to the second end 126B of the hull 126. Additionally, an outside surface of the first end 124A may be textured such that it interlocks and bonds with the concrete of the outer wall 126W of the second end 126B of the hull 126, in the region identified by the numeral 132 in FIG. 4.

Figure 5:
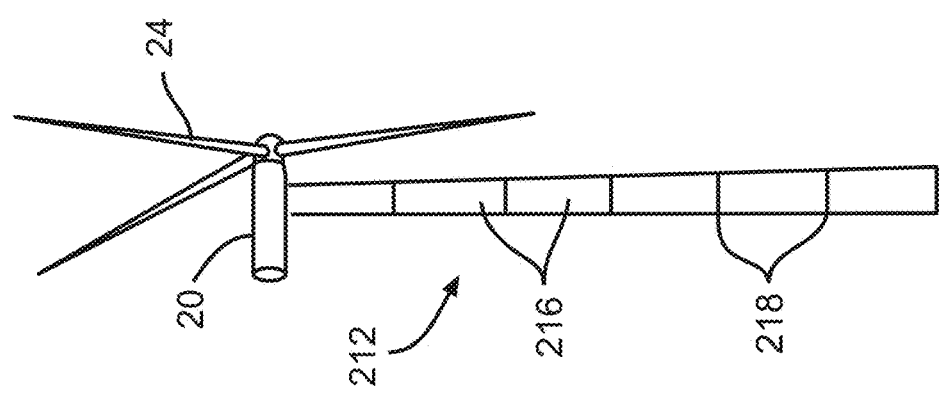
FIG. 5 is a perspective view of an alternate embodiment of the tower illustrated in FIG. 1.

FIG. 5 illustrates an alternate embodiment of the tower 212. The illustrated tower 212 is formed from a plurality of rings or sections 216. The tower sections 216 are connected to each other at connection joints 218. The connection joints 218 may be any of the connection joints described and illustrated in FIGS. 2, 3A through 3L, and 4. As described above regarding the tower 12, the tower sections may 216 may be fabricated from FRP composite material, reinforced concrete, or steel. The tower 212 may also have any suitable outside diameter and height. The tower sections 216 may also be connected by a post-tensioning cable in the same manner as described below regarding the hull sections 220.

Figure 6:
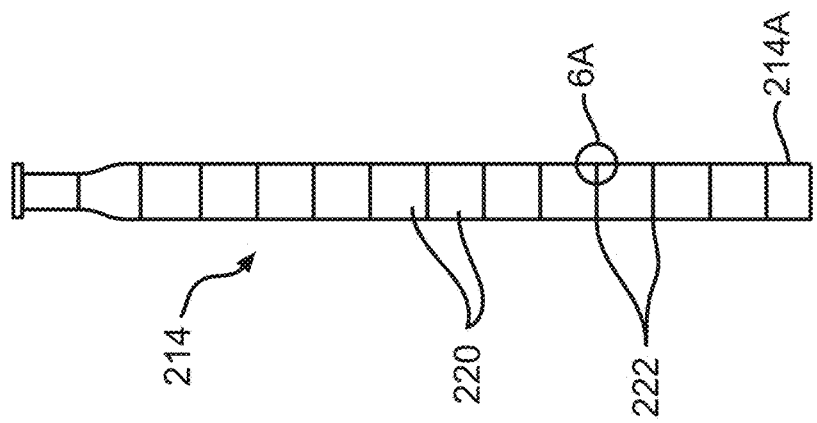
FIG. 6 is an elevational view of a first alternate embodiment of the hull illustrated in FIG. 1.

FIG. 6 illustrates a first alternate embodiment of the hull 214. The illustrated hull 214 is formed from a plurality of rings or sections 220. The hull sections 220 are connected to each other at connection joints 222. The connection joints 222 may be any of the connection joints described and illustrated in FIGS. 2, 3A through 3L, and 4. As described above regarding the hull 14, the hull sections 216 may be fabricated from FRP composite material, reinforced concrete, or steel. The hull 214 may also have any suitable outside diameter and height. Alternatively, as best shown in FIG. 6A, the hull sections 220 may be connected by a post-tensioning cable 225 running through some or all of the hull sections 220 thereby clamping the hull sections 220 together and defining the hull 214. A sealing member, such as a gasket G, may be disposed between the hull sections 220 to seal the connection joints 222. Non-limiting examples of suitable gasket material include neoprene, caulking, rubber, and other elastomers.

Figure 6B:
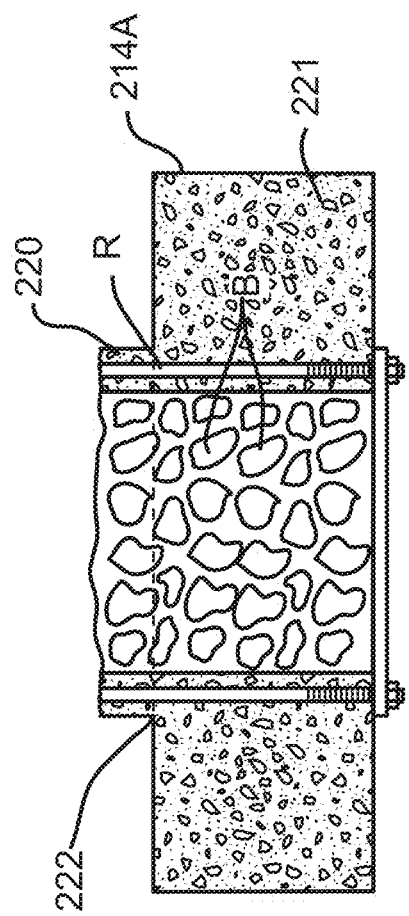
FIG. 6B is an enlarged elevational view in cross section of an alternate embodiment of the first end of the hull illustrated in FIG. 6.
Figure 6A:
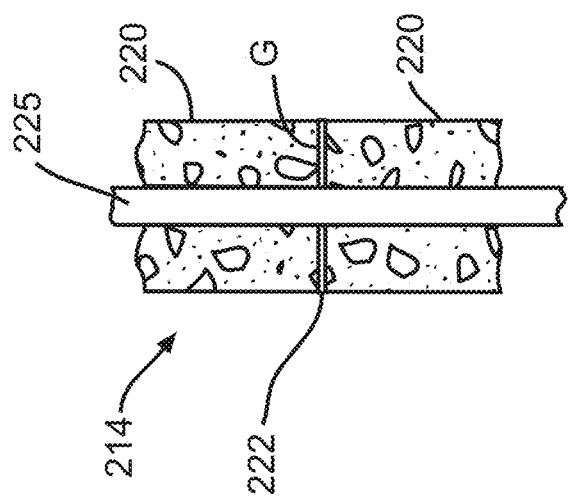
FIG. 6A is an enlarged elevational view in cross section of the connection joint illustrated in FIG. 6.

Referring to FIG. 6B, a lower most hull section 221 at the first end 214A of the hull 214 may be formed from concrete and have an outside diameter significantly larger than an outside diameter of the sections 220. The hull section 221 would thereby have a greater mass than a hull section 220, and provide additional ballast to the hull 214.

Referring to FIG. 7, a second alternate embodiment of the hull is illustrated at 28. The hull 28 includes a plurality of hollow tube members 30. In the illustrated embodiment, the tube members 30 are connected by elongated webs 32. The tube members 30 may be fabricated from FRP composite material and each tube member 30 may be filled or partially filled with foam F or concrete for added rigidity, as described above. Alternatively, the hollow tube members 30 may be formed from concrete in the same manner as the hull 14 described above. In the illustrated embodiment, the hull 28 has six hollow tube members 30. In other embodiments, the hull 28 may have more or less than six hollow tube members 30.

Referring now to FIG. 8, a second embodiment of a floating composite wind turbine platform 40 is shown anchored to the seabed S. The illustrated floating wind turbine platform 40 is a mooring line stabilized, tension leg type platform and includes the tower 12 attached to a hull platform 44 at a connection joint 46. Mooring lines 48 are attached to the platform 44 and further anchored via anchors 19 to the seabed S. The wind turbine 20 is mounted to the tower 42.

A tension leg type platform maintains its stability afloat through a buoyant hull or platform anchored to the seabed by taught mooring lines. This type of floating wind turbine platform may be substantially lighter than other types of floating wind turbine platforms because the center of gravity does not have to be below the center of buoyancy.

Referring to the embodiment illustrated in FIGS. 8 and 9, the platform 44 includes a central portion 50 and legs 52 extending radially outwardly of the central portion 50. A vertically extending portion 54 extends outwardly from the central portion 50 (upwardly when viewing FIG. 8). The interior of the platform 44 defines a cavity substantially filled with air for buoyancy. In the illustrated embodiment, the platform 44 has three legs 52. In other embodiments, the platform 44 may have more or less than three legs 52.

The platform 44 may be formed from reinforced concrete as described above. Alternatively, the platform 44 may be formed from FRP composite in the same manner as the tower 12, described above. Additionally, the platform 44 may be formed from steel.

The platform 44 may have any desired dimensions. In the illustrated embodiment for example, each of the legs 52 of the platform 44 has a length of about 45 meters when measured from a center C of the platform 44. Alternatively, each of the legs 52 may have a length within the range of from about 30 meters to about 100 meters when measured from the center C of the platform 44.

A radially extending flange 44F is formed at a first end of the vertically extending portion 54 (upper end when viewing FIG. 8). The radially extending flange 44F defines a portion of the connection joint 46.

In the illustrated embodiment, the connection joint 46 is formed by connecting the flange 12F of the tower 12 and the flange 44F. The flanges 12F and 44F may be connected by bolts 34 and nuts 36 as shown in FIG. 2 and described above. Alternatively, the flanges 12F and 44F may be connected by any other desired fasteners, such as rivets, adhesive, or by welding. Additionally, the connection joint 46 may be any of the connection joints described and illustrated in FIGS. 2, 3A through 3L, and 4.

A first end (upper end when viewing FIG. 8) of each mooring line 48 is attached to a distal end of each leg 52 of the platform 44. A second end (lower end when viewing FIG. 8) of each mooring line 48 is attached or anchored to the seabed S by an anchor 19, as described above. In the illustrated embodiment, the mooring lines 48 are configured as taught moorings. The mooring lines 48 may be formed from any desired material. Non-limiting examples of suitable mooring line material include steel rope or cable, steel chain segments, synthetic rope such as nylon rope, and composite tendons such as FRP tendons. As shown in FIG. 8, a lower portion of the tower 12 (i.e., the first end 12A) is below the water line WL.

Referring to FIG. 10, a second embodiment of the mooring line stabilized, tension leg type platform is shown at 40'. The illustrated floating wind turbine platform 40' includes the tower 12' attached to a hull platform 44' at a connection joint 46'. Mooring lines 48 are attached to the hull platform 44 and further anchored to the seabed (not shown in FIG. 10). The wind turbine 20 is mounted to the tower 12'. The illustrated hull platform 44' is substantially similar to the hull platform 44, but the vertically extending portion 54' is longer than the vertically extending portion 54. In the illustrated embodiment, the vertically extending portion 54' is configured such that a first end 54A', and its attached flange 44F is above the waterline WL. In the illustrated embodiment, the vertically extending portion 54' has a length of about 40 meters. Alternatively, the vertically extending portion 54' may have a length within the range of from about 5 meters to about 50 meters.

Referring now to FIG. 11, a third embodiment of a floating composite wind turbine platform 60 is shown anchored to the seabed S. The illustrated floating wind turbine platform 60 is similar to the mooring line stabilized, tension leg type platform 40 illustrated in FIG. 8 and includes a tower 62 attached to the hull platform 44 at a connection joint 66. Mooring lines 48 are attached to the hull platform 44 and further anchored via anchors 19 to the seabed S. The wind turbine 20 is mounted to the tower 62. Cable stays 64 are attached to the hull platform 44 and further attached to the tower 62.

In the illustrated embodiment, the tower 62 is formed as a tube and is fabricated from fiber reinforced polymer (FRP) composite material. Non-limiting examples of suitable FRP composite material include glass and carbon FRP. Alternatively, the tower 62 may be formed from concrete or from steel, as described above.

Because the cable stays 64 reduce bending stress in the tower 62, the tower 62 can be of a smaller diameter than the tower 12 illustrated in FIG. 8. For example, the tower 62 may have any suitable outside diameter and height. In the illustrated embodiment, the outside diameter of the tower 62 is about 4 meters. Alternatively, the outside diameter of the tower 62 may be any other desired diameter, such as within the range of from about 3 meters to about 10 meters. In the illustrated embodiment, the height of the tower 62 is about 90 meters. Alternatively, the height of the tower 62 may be within the range of from about 40 meters to about 150 meters.

The interior of the tower 62 also defines a cavity (not shown in FIG. 11) between the first end 62A and the second end 62B. A radially extending flange 62F is formed at the first end 62A of the tower 62, as best shown in FIG. 4. The radially extending flange 62F defines a portion of the connection joint 66.

In the illustrated embodiment, the connection joint 66 is formed by connecting the flange 62F and the flange 44F. The flanges 62F and 44F may be connected by bolts 34 and nuts 36 as shown in FIG. 2 and described above. Alternatively, the flanges 62F and 44F may be connected by any other desired fasteners, such as rivets, adhesive, grout, or by welding. Additionally, the connection joint 66 may be any of the connection joints described and illustrated in FIGS. 2, 3A through 3L, and 4.

A first end (lower end when viewing FIG. 11) of each cable stay 64 is attached to a distal end of each leg 52 of the hull platform 44. A second end (upper end when viewing FIG. 11) of each cable stay 64 is attached to a mid-point 62M of the tower 62. The cable stays 64 support and reduce bending stress in the tower 62. The cable stays 64 may be formed from any desired material. Non-limiting examples of suitable mooring line material include steel rope or cable, steel chain segments, synthetic rope such as nylon rope, and composite tendons such as FRP tendons.

Referring now to FIG. 12, a fourth embodiment of a floating composite wind turbine platform 70 is shown anchored to the seabed S. The illustrated floating wind turbine platform 70 is substantially identical to the floating composite wind turbine platform 60 illustrated in FIG. 11 and includes the tower 62 attached to the hull platform 44 at the connection joint 66. Mooring lines 74 are attached to the hull platform 44 and further anchored to the seabed S. The wind turbine 20 is mounted to the tower 62. Cable stays 64 are attached to the hull platform 44 and further attached to the tower 62.

In lieu of the taught mooring lines 48 shown in FIG. 11, the mooring lines 74 are configured as catenary moorings, as described above. The floating composite wind turbine platform 70 further includes a large mass 72 suspended from the hull platform 44 by cables 76. The mass 72 may have any desired weight, such as a weight of about 1000 kg. Alternatively, the weight of the mass 72 may be adjustable so as have a weight within the range of from about 10 kg to about 1500 kg. The mass 72 may be formed from any material or combination of materials having the desired weight. Non-limiting examples of material suitable for use as the mass 72 include one or more rocks, pieces of concrete, and pieces of steel. These one or more items may be contained in a net, a bucket, or other outer shell or container and may added or removed therefrom to achieve the desired weight.

A first end (lower end when viewing FIG. 12) of each cable 76 is attached to the mass 72. A second end (upper end when viewing FIG. 12) of each cable 76 is attached to a distal end of each leg 52 of the hull platform 44. Non-limiting examples of suitable cable material include steel rope or cable, steel chain segments, and synthetic rope such as nylon rope, and composite tendons such as FRP tendons. In FIG. 12, the mass 72 is shown suspended from the wind turbine platform 70. It will be understood that the mass 72 may be used with, i.e., suspended from, any of the embodiments of wind turbine platform disclosed herein, including the wind turbine platforms 40, 60, 80, 100, 140, and 440.

Referring now to FIG. 13, a fifth embodiment of a floating composite wind turbine platform 80 is shown anchored to the seabed S. The illustrated floating wind turbine platform 80 is a mooring line stabilized, semi-submersible type platform and includes a tower 82 attached to a pontoon platform 84. Mooring lines 90 are attached to the pontoon platform 84 and further anchored via anchors 19 to the seabed S. The wind turbine 20 is mounted to the tower 82. The tower 82 may be any suitable tower and may be identical to the tower 12 described above. Thus, the tower 82 may be formed from reinforced concrete, FRP composite, or from steel as described above.

The pontoon platform 84 includes a plurality of buoyancy members or pontoons 86 connected by structural members 88. In the illustrated embodiment, the pontoon platform 84 has three pontoons 86. In other embodiments, the pontoon platform 84 may have more or less than three pontoons 86. The illustrated pontoons 86 have a radially extending flange 87 formed at a first end 86A of each pontoon 86. Alternatively, the pontoons 86 may be formed without the flanges 87.

Figure 16:
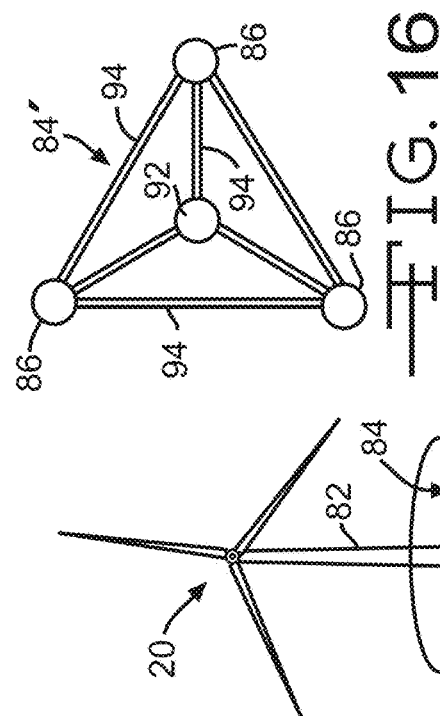
FIG. 16 is a top plan view of a second embodiment of the pontoon platform illustrated in FIG. 14.

In the embodiment of the pontoon platform 84 as shown in FIG. 13, the tower 82 may be attached to one pontoon 86 via a connector joint (not shown). This connector joint may be any of the connection joints described and illustrated in FIGS. 2, 3A through 3L, and 4. In a second embodiment of the pontoon platform 84' as shown in FIG. 16, the pontoons 86 are connected to a central hub 92 by structural members 94. In this embodiment, the tower 82 is attached to the central hub 92 via a connector joint (not shown), but such as any of the connection joints described and illustrated in FIGS. 2, 3A through 3L, and 4.

In the illustrated embodiment, the pontoons 86 are substantially hollow and define a cavity. A portion of the cavity of any of the pontoons 86 may be filled with ballast B to help stabilize the floating wind turbine platform 80. Alternatively, the ballast B may fill the entire cavity of any of the pontoons 86. Non-limiting examples of suitable ballast material include water, rocks, copper ore, and other dense ores. Other sufficiently dense material may also be used as ballast to fill or partially fill the cavities of the pontoons 86.

The pontoons 86 may be formed from reinforced concrete, FRP composite, or from steel as described above. The structural members 88 may also be formed from reinforced concrete, FRP composite, or from steel as described above.

The pontoon platform 84 may have any desired dimensions. For example, each of the pontoons 86 may have an outside diameter of about 12 meters and a height of about 30 meters. Alternatively, the pontoons 86 may have an outside diameter within the range of from about 10 to about 50 meters and a height within the range of from about 10 meters to about 40 meters. A distance D measured between the centers of the pontoons 86 may be about 30 meters. Alternatively, the distance D may be within the range of from about 15 meters to about 100 meters.

A first end (upper end when viewing FIG. 13) of each mooring line 90 is attached to one pontoon 86 of the pontoon platform 84. A second end (lower end when viewing FIG. 13) of each mooring line 90 is attached or anchored to the seabed S by the anchor 19, as described above. In the illustrated embodiment, the mooring lines 90 are configured as catenary moorings. The mooring lines 90 may be formed from any desired material. Non-limiting examples of suitable mooring line material include steel rope or cable, steel chain segments, and synthetic rope such as nylon rope, and composite tendons such as FRP tendons.

Figure 14:
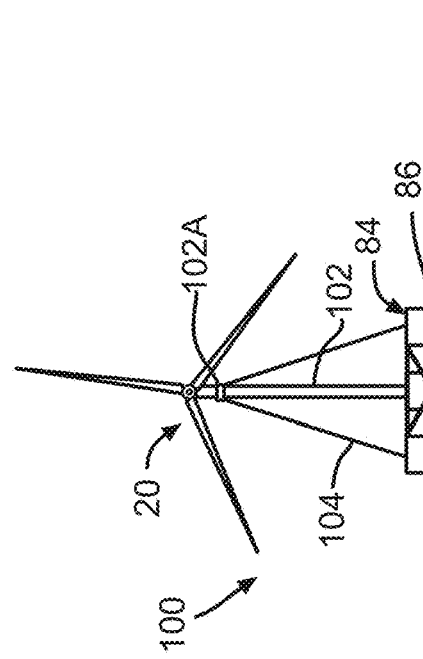
FIG. 14 is an elevational view of a sixth embodiment of a floating composite wind turbine platform, showing a pontoon platform in accordance with this invention.

Referring now to FIG. 14, a sixth embodiment of a floating composite wind turbine platform 100 is shown anchored to the seabed S. The illustrated floating wind turbine platform 100 is substantially similar to the floating composite wind turbine platform 80 illustrated in FIG. 13 and includes a tower 102 attached to the pontoon platform 84, as described above. Each mooring line 90 is attached to one pontoon 86 of the pontoon platform 84 and further anchored to the seabed S via the anchor 19. The wind turbine 20 is mounted to the tower 102. A cable stay 104 is attached to each pontoon 86 of the pontoon platform 84 and further attached to a first end 102A of the tower 102.

Because the cable stays 104 reduce bending stress in the tower 102, the tower 102 can be of a smaller diameter than the tower 82 illustrated in FIG. 13. For example, the tower 102 may have any suitable outside diameter and height. In the illustrated embodiment, the outside diameter of the tower 102 is about 4 meters. Alternatively, the outside diameter of the tower 102 may be any other desired diameter, such as within the range of from about 3 meters to about 12 meters. In the illustrated embodiment, the height of the tower 102 is about 90 meters. Alternatively, the height of the tower 102 may be within the range of from about 50 meters to about 140 meters.

Figure 15:
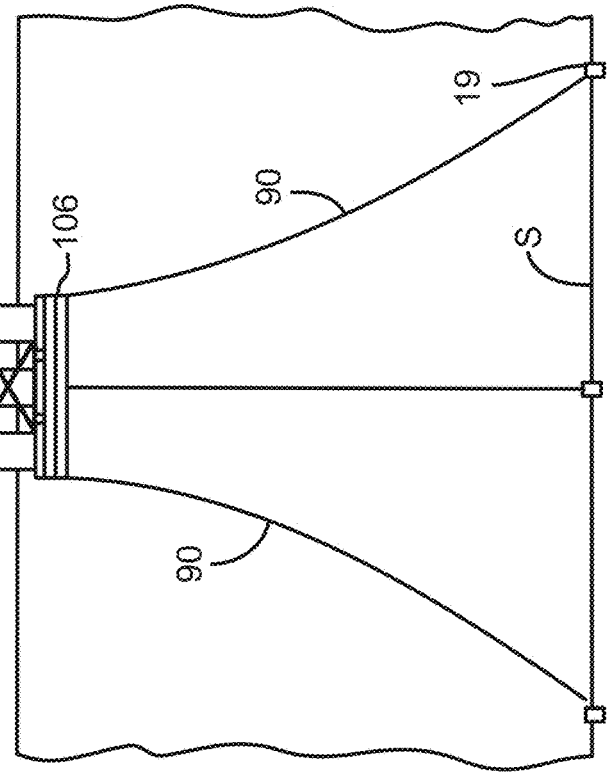
FIG. 15 is an elevational view of the pontoon platform illustrated in FIG. 14, showing a rotating turret.

Referring now to FIG. 15, the pontoon platform 84 may include a rotating turret 106 mounted to a lower end of the pontoon platform 84. In the embodiment illustrated in FIG. 15, the mooring lines 90 are attached to the rotating turret 106, rather than the pontoons 86. In this embodiment, the floating composite wind turbine platform, such as the platforms 80 and 100, may rotate relative to the turret 106 and thus self-align in response to the wind direction and ocean currents.

Figure 17:
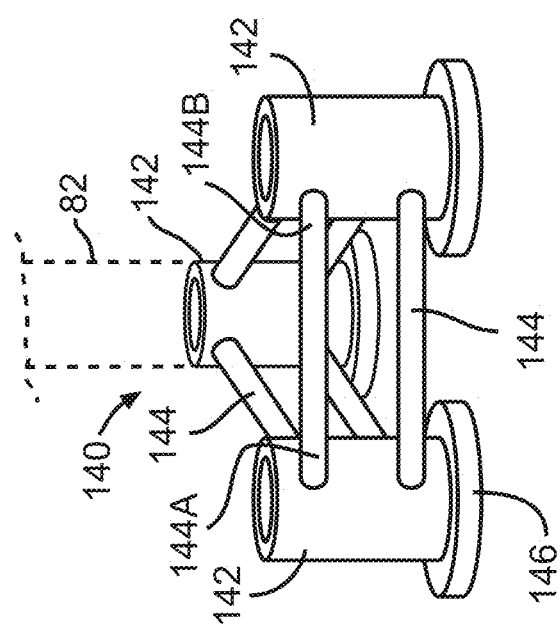
FIG. 17 is a perspective view of a third embodiment of the pontoon platform illustrated in FIG. 14.
Figure 18A:
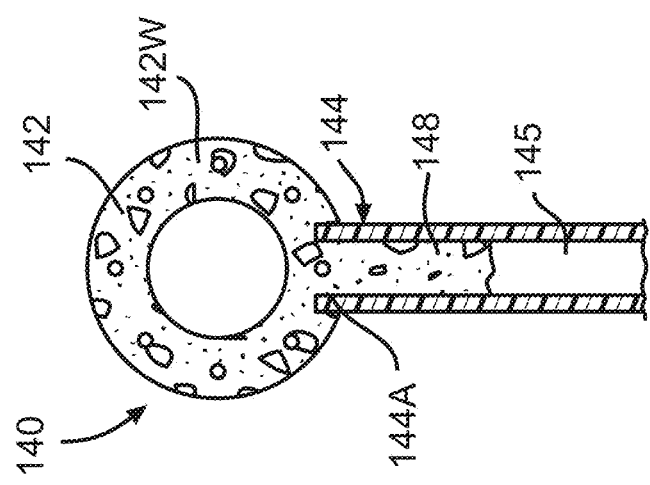
FIG. 18A is a top plan view in cross section of a portion of a first embodiment of a joint between the pontoon and the structural member of the pontoon platform illustrated in FIG. 17.
Figure 18B:
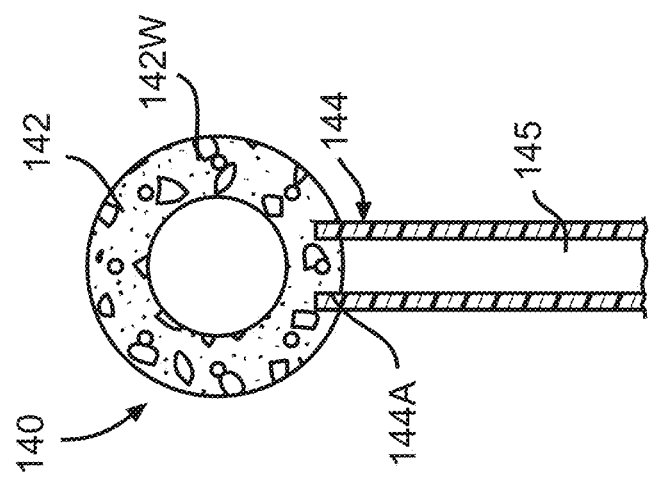
FIG. 18B is a top plan view in cross section of a portion of a second embodiment of the joint between the pontoon and the structural member of the pontoon platform illustrated in FIG. 17.

Referring now to FIGS. 17, 18A, and 18B, a third embodiment of the pontoon platform is illustrated at 140. The pontoon platform 140 includes a plurality of buoyancy members or pontoons 142 connected by structural members 144. In the illustrated embodiment, the pontoon platform 140 has three pontoons 142. In other embodiments, the pontoon platform 140 may have more or less than three pontoons 142. The illustrated pontoons 142 have a radially extending flange 146 formed at a first end 142A of each pontoon 142. Alternatively, the pontoons 142 may be formed without the flanges 146.

In the illustrated embodiment, the pontoons 142 are substantially hollow and define a cavity and are formed from reinforced concrete. The illustrated structural members 144 are substantially tubular, define a cavity 145, and are formed from FRP composite.

As best shown in FIG. 18A, in a first embodiment of the pontoon platform 140, the pontoon 142 includes an outer wall 142W. First and second ends 144A and 144B, respectively, of the structural members 144 are inserted into the outer walls 142W of the pontoons 142. The concrete that forms the outer wall 142W extends into the cavities 145 of each structural member 144 to define a rigidity member 148. When cured, the rigidity member 148 provides added rigidity to the pontoon platform 140.

A second embodiment of the pontoon platform is illustrated at 140' in FIG. 18B. The pontoon platform 140 is substantially identical to the pontoon platform 140, but does not include the rigidity member 148. The first and second ends 144A and 144B, respectively, of the structural members 144 are inserted into and bonded to the outer walls 142W of the pontoons 142.

The rigidity member 148 may be formed by inserting the first and second ends 144A and 144B, respectively, of the structural members 144 into a pontoon form (not shown) which defines the shape of the pontoon to be formed. Concrete may be poured into the pontoon form to define the outer wall 142W of the pontoon 142. This concrete will also flow into the cavity 145 of the structural member 144. When the concrete is cured, the concrete of the rigidity member 148 is contiguous with the concrete of the outer wall 142W of the pontoon 142, thus the first and second ends 144A and 144B of the structural members 144 are respectively embedded in and bonded to the pontoons 142. Additionally, an outside surface of each of the first and second ends 144A and 144B, respectively, of the structural members 144 may be textured such that each outside surface interlocks and bonds with the concrete of the outer walls 142W of the pontoons 142.

It will be understood that the structural members 144 may also be formed from reinforced concrete or from steel as described above.

In the embodiment of the pontoon platform 140 as shown in FIG. 17, a tower, such as the tower 82 (illustrated by a phantom line in FIG. 17) may be attached to one of the pontoons 142 via a connector joint (not shown). This connector joint may be any of the connection joints described and illustrated in FIGS. 2, 3A through 3L, and 4.

Referring now to FIG. 21, a fourth embodiment of the pontoon platform is illustrated at 440. The pontoon platform 440 includes a plurality of buoyancy members or pontoons 442 connected to a central pontoon 444 by structural members 446. In the illustrated embodiment, the pontoon platform 440 has three pontoons 442. In other embodiments, the pontoon platform 440 may have more or less than three pontoons 442. The illustrated pontoons 442 have a radially extending flange 448 formed at a first end 442A of each pontoon 442. Alternatively, the pontoons 442 may be formed without the flanges 448. In this embodiment, a tower, such as the tower 82, is attached to the central pontoon 444 via a connector joint (not shown), but such as any of the connection joints described and illustrated in FIGS. 2, 3A through 3L, and 4. Alternatively, the tower 82 may be attached to any of the three pontoons 442.

Each of the illustrated pontoons 442 is formed from a plurality of rings or sections 450. The sections 450 are connected to each other at connection joints 452. As described above regarding the hull 14, the sections 450 may be fabricated from FRP composite material, reinforced concrete, or steel. The sections 450 may be connected by post-tensioning cables 454 running through some or all of the sections 450 thereby clamping the sections 450 together and defining the pontoon 442. A sealing member, such as the gasket G, may be disposed between the sections 450 to seal the connection joints 452. Alternatively, the connection joints 452 may be any of the connection joints described and illustrated in FIGS. 2, 3A through 3L, and 4.

Attachment rings 456 are circumferentially mounted to an outside surface of the pontoons 442 and provide a mounting structure for attaching the structural members 446 to the pontoons 442. The attachment rings 456 may be formed from steel, FRP composite material, or reinforced concrete. Alternatively, the attachment rings 456 may be mounted in the connection joint 452 between two adjacent sections 450.

Once the sections 450 are assembled to form the pontoon 442, a closing member 458 may be attached to the second end 442B of the pontoon 442.

The principle and mode of operation of the wind turbine platform have been described in its preferred embodiments. However, it should be noted that the wind turbine platform described herein may be practiced otherwise than as specifically illustrated and described without departing from its scope.

What is claimed is:

1. A wind turbine platform configured to float in a body of water and support a wind turbine thereon, the wind turbine platform comprising:
    a buoyant hull platform, wherein the hull platform includes a central portion and three buoyant legs extending radially outwardly from the central portion;
    a wind turbine tower centrally mounted on the central portion of the hull platform;
    a wind turbine mounted to the wind turbine tower;
    a plurality of anchors connected to the hull platform and to the seabed wherein each of the three legs is connected to one of the plurality of anchors by a catenary mooring line;
    a weight-adjustable mass; and
    a cable extending between a distal end of each of the three buoyant legs and the weight-adjustable mass, thus suspending the weight-adjustable mass from the hull platform.

2. The wind turbine platform according to claim 1, wherein the cables are formed from one of steel rope, steel cable, steel chain segments, synthetic rope, and composite tendons.

3. The wind turbine platform according to claim 1, wherein the mass has a weight between 10 kg and 1500 kg.

4. The wind turbine platform according to claim 1, wherein the mass is formed from one or more of rocks, pieces of concrete, and pieces of steel.

5. The wind turbine platform according to claim 1, wherein the mass is suspended within a container.

6. The wind turbine platform according to claim 5, wherein the container is one of a net and a bucket.

7. A semi-submersible wind turbine platform configured to float semi-submerged on a body of water and support a wind turbine thereon, the wind turbine platform comprising:
    a central buoyant pontoon;
    a wind turbine tower mounted on the central buoyant pontoon;

a wind turbine mounted to the wind turbine tower;

three outer buoyant pontoons, the outer pontoons being connected to the central pontoon by structural members, with the central buoyant and outer buoyant pontoons having sufficient buoyancy to support a wind turbine tower;

a plurality of anchors connected to the wind turbine platform and to the seabed wherein each of the three outer pontoons is connected to one of the plurality of anchors by a catenary mooring line;

a weight-adjustable mass; and a cable extending between each of the three outer buoyant pontoons and the weight-adjustable mass, thus suspending the weight-adjustable mass from the wind turbine platform wherein a longitudinal axis of the central buoyant pontoon and longitudinal axes of the outer buoyant pontoons are substantially parallel to each other and substantially perpendicular to a surface of the body of water in which the semi-submersible wind turbine platform floats; and wherein the wind turbine is configured to operate while the semi-submersible wind turbine platform floats, semi-submerged, in the body of water.

* * * * *